US008702346B2

(12) United States Patent  
Meert et al.

(10) Patent No.: US 8,702,346 B2  
(45) Date of Patent: Apr. 22, 2014

(54) LANDSCAPING CHANNEL LINER

(76) Inventors: Randy J. Meert, Elkhart, IN (US);  
Loren R. Graber, Nappanee, IN (US)

( * ) Notice: Subject to any disclaimer, the term of this patent is extended or adjusted under 35 U.S.C. 154(b) by 0 days.

(21) Appl. No.: 12/716,618

(22) Filed: Mar. 3, 2010

(65) Prior Publication Data

US 2010/0226720 A1 Sep. 9, 2010

Related U.S. Application Data

(60) Provisional application No. 61/158,150, filed on Mar. 6, 2009.

(51) Int. Cl.  
*E02B 5/02* (2006.01)

(52) U.S. Cl.  
USPC ........................................................ 405/118

(58) Field of Classification Search  
USPC ............... 405/118, 119, 121; 47/33; 52/169.5  
See application file for complete search history.

(56) References Cited

U.S. PATENT DOCUMENTS

| 215,740 | A | * | 5/1879 | Haucke ......................... 405/121 |
| 1,237,544 | A | * | 8/1917 | Norton ......................... 405/121 |
| 3,446,025 | A | * | 5/1969 | Koch ............................. 405/43 |
| 4,581,857 | A | * | 4/1986 | Harbom ......................... 52/12 |
| 5,121,569 | A | * | 6/1992 | Thomas ......................... 47/33 |
| 7,306,402 | B2 | | 12/2007 | Graber et al. |

FOREIGN PATENT DOCUMENTS

| JP | 53135027 | A | * | 11/1978 |
| JP | 54052333 | A | * | 4/1979 |
| JP | 54115417 | A | * | 9/1979 |
| JP | 54115418 | A | * | 9/1979 |
| JP | 54144479 | A | * | 11/1979 |
| JP | 02108754 | A | * | 4/1990 |

* cited by examiner

*Primary Examiner* — Sunil Singh  
(74) *Attorney, Agent, or Firm* — Barnes & Thornburg LLP

(57) ABSTRACT

A landscaping channel liner is provided that includes a longitudinally-extending trough having a longitudinally-extending floor located between opposed longitudinally-extending sidewalls extending therefrom. Attachment clips extend longitudinally on each of the sidewalls opposite the floor. Each attachment clip is configured to clasp onto an adjacent attachment clip to hold adjoining channel liners together.

1 Claim, 8 Drawing Sheets

LANDSCAPING CHANNEL LINER

RELATED APPLICATIONS

The present application is related to and claims priority to U.S. Provisional Patent Application Ser. No. 61/158,150, filed on Mar. 6, 2009, entitled "Landscaping Channel Liner. To the extent not included below, the subject matter disclosed in those applications is hereby expressly incorporated into the present application

TECHNICAL FIELD

The present disclosure relates generally to landscaping apparatus and, more particularly, to a channel liner apparatus for use as a vegetation barrier, water drainage, and/or landscaping material receptacle.

BACKGROUND AND SUMMARY

There exist numerous instances where a channel liner is desirable for landscaping applications. Typically, such a channel liner is used for drainage and erosion inhibiting purposes. The channel liner can be filled with landscaping materials, such as mulch or rocks, for aesthetic purposes as well. Conventional landscaping channel liners are made from a formed material and are placed below the ground surface for lining a trench or culvert. Often the channel liners are formed in sections that are combinable to create an extended channel liner of any desired length.

Edging materials are also useful for various landscaping applications. Edging material typically serves as a barrier between ground surfaces, or a ground surface and a structure. Such edging materials are placed into the ground, often with a portion extending upward therefrom to facilitate a barrier. Similar to landscaping channel liners, the edging material can be made from a formed material which is combinable to create an extended edging material barrier.

It would be beneficial to provide a landscaping channel liner as an alternate configuration to perform the above-described and other functions typical of such channel liners and barriers.

Accordingly, an illustrative embodiment of a landscaping channel liner apparatus of the present disclosure is provided herein. The landscaping channel liner apparatus illustratively comprises a longitudinally-extending trough and longitudinally-extending receptacles. The longitudinally-extending trough has a longitudinally-extending floor located between opposed longitudinally-extending side walls extending there from. The longitudinally-extending trough also has first and second opposed transverse open ends formed from the floor and side walls. Each of the side walls defines a longitudinally-extending edge located opposite the longitudinally-extending floor. A longitudinally-extending receptacle is located on each longitudinally-extending edge and includes first and second transverse open ends. Each of the longitudinally-extending side walls and floor extends longitudinally beyond the first transverse open end of each of the longitudinally-extending receptacles. The first transverse open end of each of the longitudinally-extending receptacles faces the first transverse open end of the longitudinally-extending trough.

In the above and other illustrative embodiments, the landscaping channel liner apparatus may also provide: a second traverse open end of each of the longitudinally-extending receptacles, the open ends being essentially flush with the second transverse open end of the longitudinally-extending trough; first and second connectors, wherein the first connector being partially fitted in the first transverse open end of the first longitudinally-extending receptacle and wherein the second connector being partially fitted in the other of the longitudinally-extending receptacles through its first transverse open end; a portion of the first connector extending from the first transverse open end of one of the longitudinally-extending receptacles and being fitted into the second transverse open end of one of the longitudinally-extending receptacles of a second landscaping channel liner apparatus; a portion of the second connector extending from the first transverse open end of the other of the longitudinally-extending receptacles and being fitted into the other second transverse open end of the other of the longitudinally-extending receptacles of the second landscaping channel liner apparatus; the second transverse open end of the second landscaping channel liner apparatus being at least partially encompassed by a portion of the landscaping channel liner apparatus at the first transverse open end; spikes that extend from at least one of the side walls; and first and second connectors that interference fit in their respective longitudinally-extending receptacles.

Another illustrative embodiment of the present disclosure provides a landscaping channel liner apparatus which comprises a longitudinally-extending trough, receptacles, and connectors. The longitudinally-extending trough has a longitudinally-extending floor located between opposed longitudinally-extending side walls extending there from. The longitudinally-extending trough also has first and second opposed transverse open ends formed from the floor and side walls. Each of the side walls defines a longitudinally-extending edge located opposite the longitudinally-extending floor. A receptacle is located on each of the longitudinally-extending edges. A connector is engaged to each receptacle and extends there from. Each connector is also spaced apart from and positioned substantially parallel to the longitudinally-extending edge of its respective wall.

In the above and other illustrative embodiments, the landscaping channel liner apparatus may also provide: a receptacle from a second landscaping channel liner apparatus engaging the connector by fitting the receptacle between the longitudinally-extending edge and the connector; the floor of the second landscaping channel liner apparatus overlaps a portion of the floor of the landscaping channel liner apparatus; the floor comprising removable portions; the removable portions being perforated segments; and the connector interference fits in the receptacle.

Another illustrative embodiment of the present disclosure provides a landscaping channel liner apparatus which comprises a longitudinally-extending trough and a selectively removable portion. The longitudinally-extending trough comprises a floor and at least one wall upwardly-extending therefrom. The selectively removable portion is disposed on the floor so as to selectively form an opening there through.

In the above and other illustrative embodiments, the landscaping channel liner apparatus may also provide: the selectively removable portion being defined by at least one perforated seam; the selectively removable portion being a plurality of selectively removable portions; the plurality of selectively removable portions are each defined by at least one perforated seam; and the plurality of selectively removable portions share a common perforated seam.

Additional features and advantages of the landscaping channel liner will become apparent to those skilled in the art upon consideration of the following detailed description of the illustrated embodiment exemplifying the best mode of carrying out the landscaping channel liner as presently perceived.

BRIEF DESCRIPTION OF DRAWINGS

The present disclosure will be described hereafter with reference to the attached drawings which are given as non-limiting examples only, in which:

FIG. 14 is another detail cross-sectional view of the sidewall portion of the landscaping channel liner of FIG. 10 showing a stake extending there through.

Figure 1:
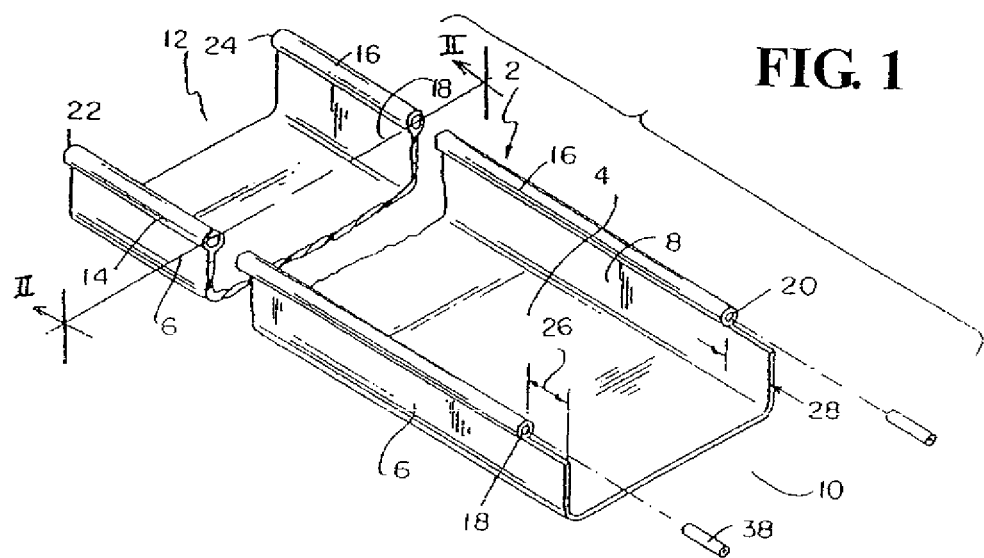
FIG. 1 is a perspective view of an illustrative embodiment of a landscaping channel liner.

Corresponding reference characters indicate corresponding parts throughout the several views. The exemplification set out herein illustrates embodiments of the landscaping channel liner apparatus, and such exemplification is not to be construed as limiting the scope of the landscaping channel liner apparatus in any manner.

DETAILED DESCRIPTION OF THE DRAWINGS

A perspective view of an illustrative embodiment of a landscaping channel liner 2 is shown in FIG. 1. Channel liner 2 is longitudinally-extending to any variety of lengths. For example, channel liner 2 can be formed in 2, 4, 6, or 8 foot lengths. The illustrative channel liner 2 shown in FIG. 1 comprises a longitudinally-extending floor 4, with longitudinally-extending side walls 6 and 8, and longitudinally-extending receptacles 14 and 16. Channel liner 2 terminates at ends 10 and 12. Side walls 6 and 8 extend generally upwardly from floor 4. Receptacles 14 and 16 illustratively include receptacle openings 18, 20, 22, and 24. It is appreciated that, in the illustrative embodiment, receptacles 14 and 16 are tubes that are hollow throughout their longitudinal extent. Further in this illustrative embodiment, at end 10, the floor 4, side wall 6 and side wall 8 extend longitudinally from receptacle openings 18 and 20. This forms wall extensions 26 and 28.

It is appreciated that channel liner 2 may comprise any variety of materials and be made by any variety of methods. Illustratively, liner 2 may be formed by extruding a polyethylene material. In addition, it is appreciated that channel liner 2 may, illustratively, be flexible such that end 10 can be fitted within end 12 of a second channel liner 2' to connect the two for providing a longer channel liner. (See, also, FIGS. 5 and 9.)

Figure 2:
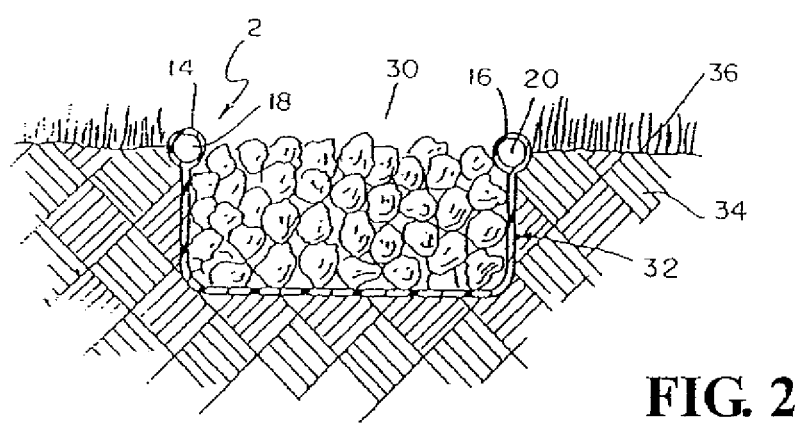
FIG. 2 is an end view of the landscaping channel liner of FIG. 1 with landscaping material located therein.

An end view of landscaping channel liner 2 containing landscaping materials, such as rocks 30, is shown in FIG. 2. An illustrative utility of channel liner 2 is depicted in this view. The liner 2 can be used to line a channel or trench formed beneath the ground surface. Illustratively, channel or trench 32 is formed within ground 34 below the ground surface 36. Channel liner 2 is placed within trench 32. Illustratively, at least a portion of receptacles 14 and 16 may stand above ground surface 36, as shown in FIG. 2. This, for example, may serve to block objects on ground surface 36, as well as provide aesthetic appeal to the placed liner 2.

Figure 3:
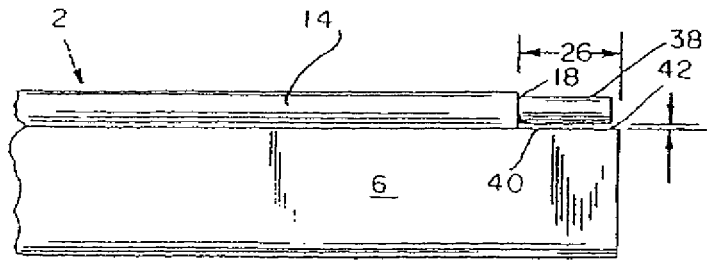
FIG. 3 is a side view of the landscaping channel liner of FIG. 1.

A side view of a portion of channel liner 2 is shown in FIG. 3. This view depicts how an illustrative embodiment of receptacle opening 18 does not extend to end 10. Rather, wall extension 26 extends a distance longitudinally beyond opening 18 of receptacle 14. Also shown in this illustrative embodiment is connector 38 that is partially disposed within opening 18 of receptacle 14. A portion of connector 38, extending from the opening of receptacle 14, is configured to extend into a corresponding receptacle opening, such as receptacle opening 22 of end 12 of a subsequent channel liner. As the illustrated embodiment further shows, the connector extending from opening 18 is also spaced apart from the top edge 40 of wall extension 26. This space is indicated by reference numeral 42. The space assists in providing a tolerance between adjoining channel liners.

Figure 4:
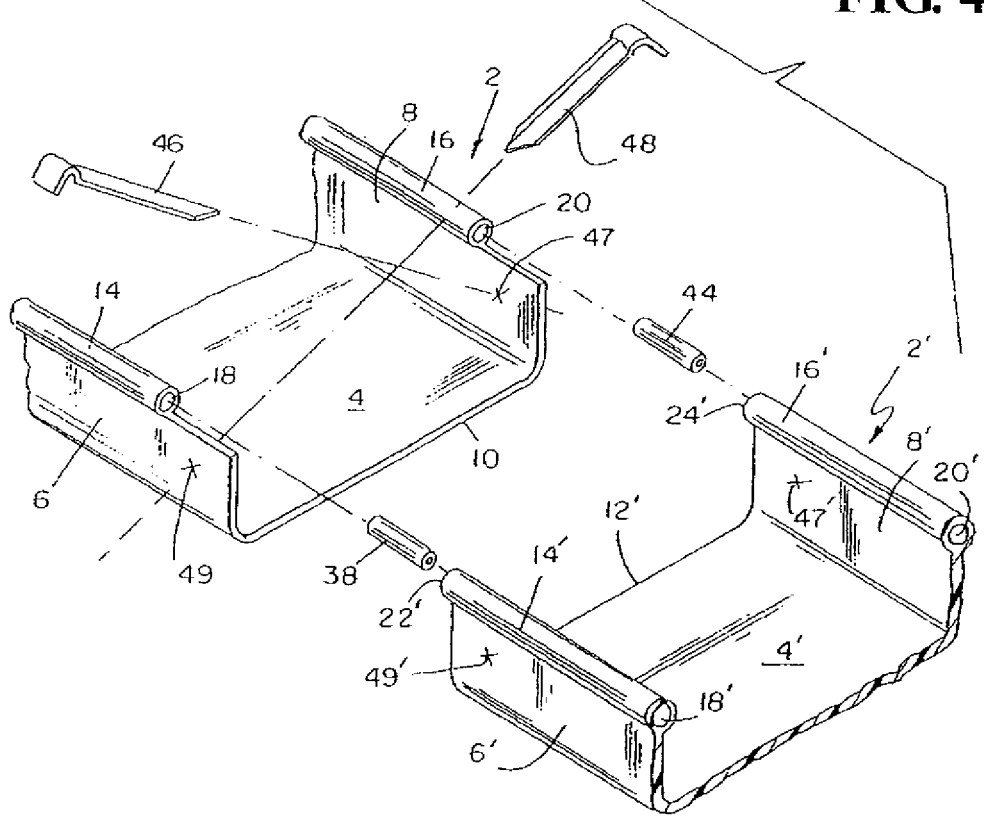
FIG. 4 is an exploded perspective view of a first and second landscaping channel liner.

An exploded view of a plurality of channel liners 2 and 2' is shown in FIG. 4. A utility of channel liner 2 is its ability to connect with additional channel liners to produce a liner of any desired length. Accordingly, a first channel liner 2 couples with a second channel liner 2' via connectors 38 and 44 which are received in openings 18 and 20 at end 10 of liner 2, and openings 22 and 24 at end 12 of channel liner 2'. Because coupling end 10 of channel liner 2 with end 12 of channel liner 2' can be repeated any number of times, a resulting channel liner of indefinite length can be achieved.

Also shown in FIG. 4 are spikes 46 and 48. Illustratively, spikes 46 and 48 can be driven through side walls 6 and 8, respectively, to assist in anchoring channel liner 2 into ground 34. (See, also, FIG. 6.) By positioning spikes 46 and 48 into the ground 34 illustratively askew, and non-perpendicular to the ground surface 36, more surface area of the spikes serve to anchor the channel liner 2 in place. It is appreciated that any number of spikes can be used on the channel liner 2, and their position relative to liner 2 can vary.

Figure 5:
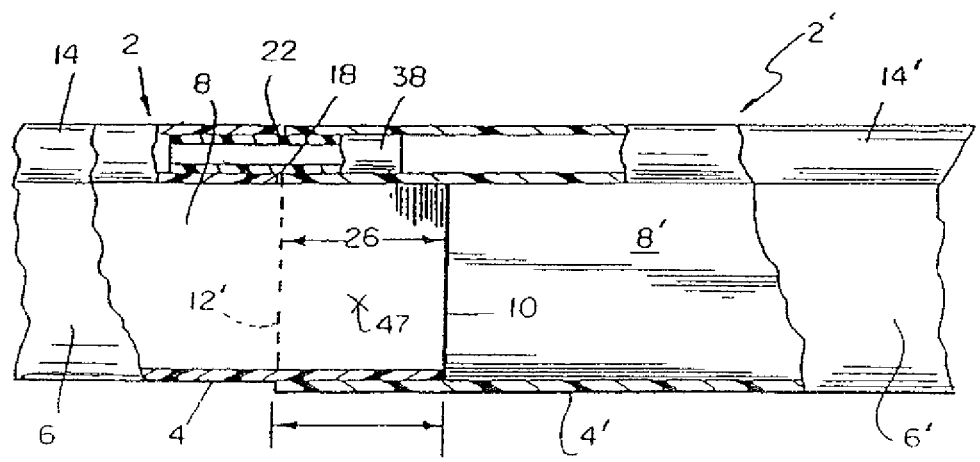
FIG. 5 is a side, partially cutaway, and cross-sectional view of coupled first and second landscaping channel liners.

A side, partially cut-away, and cross-sectional views of coupled first and second channel liners 2 and 2' are shown in FIG. 5. It is contemplated herein for this illustrative embodiment that a portion of floor 4 and side walls 6 and 8 at end 12 of first channel liner 2 receive corresponding floor 4 and side wall portions 6 and 8 of end 10 of second channel liner 2'. Though channel liners 2 and 2' illustratively maintain a uniform cross-section, they can be made of a flexible material. This allows a portion of one end, including floor and side wall sections of the first channel liner, to fit within a portion of the corresponding floor and side walls of the opposite end of the second channel liner. This is accomplished without causing deleterious deformation of the portion of the second channel liner that is fitted within the first channel liner. It is appreciated that, in this illustrative embodiment, either floor 4 and side walls 6 and 8 of end 12 can be fitted within floor 4 and side walls 6 and 8 of end 10, or, conversely, floor 4 and side walls 6 and 8 of end 10 can be fitted within the walls or the floor 4 and side walls 6 and 8 of end 12. The material of channel liners 2 and 2' makes the liner flexible enough so that openings 18 and 20 of channel liner 2 can be aligned with corresponding openings 22 and 24 of channel liner 2'. (See, also, FIG. 4.) This allows mating of openings 22 and 24 of channel liner 2' with receptacles 14 and 16, respectively, of channel liner 2.

Figure 6:
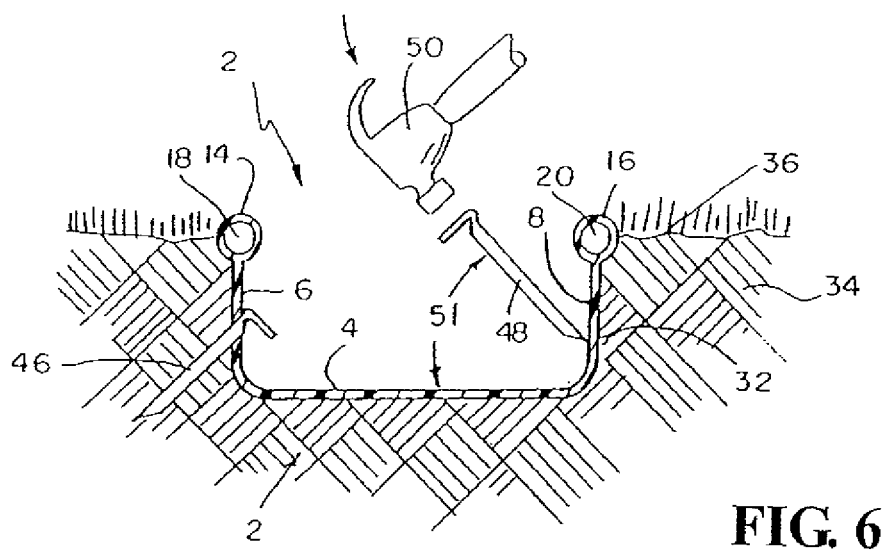
FIG. 6 is an end view of an illustrative landscaping channel liner with illustrative spikes extending therefrom.

An end view of an illustrative landscaping channel liner 2 located in a trench 32 with a spike 46 disposed there through is shown in FIG. 6. In this illustrative embodiment, spikes 46 and 48 are disposed through walls 6 and 8, respectively, and into ground 34. (See, also, FIG. 3.) With the spikes being disposed through the side walls 6 and 8, as opposed to the floor 4, they can provide an anchor for preventing channel liner 2 from migrating upward out of the trench 32. In this illustrative embodiment, a hammer 50 or similar device can be used to drive spikes 46 and 48 through the side walls and into the ground 34.

Figure 7:
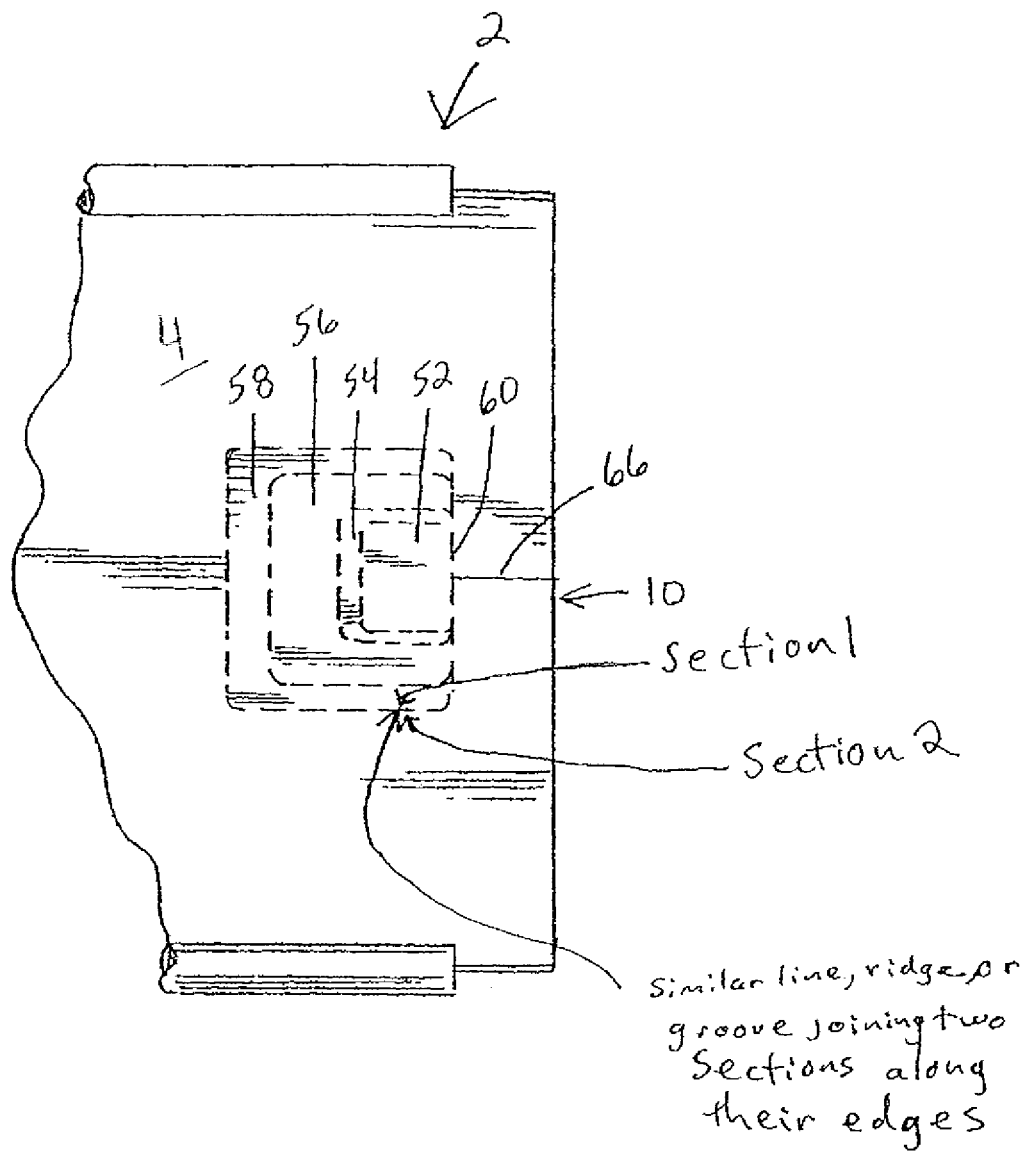
FIG. 7 is a top view of an illustrative embodiment of a landscaping channel liner configured to accommodate a post.
Figure 8:
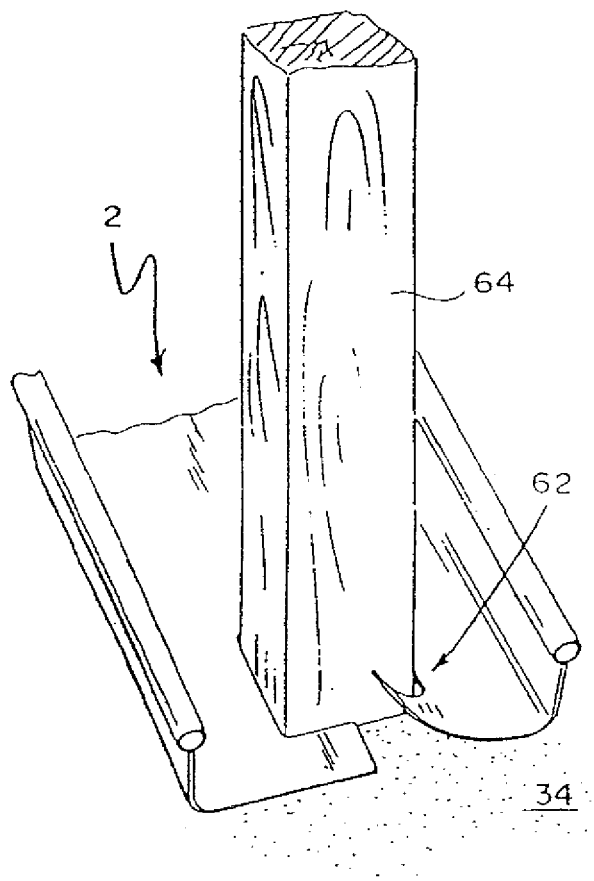
FIG. 8 is a perspective view of the landscaping channel liner of FIG. 7 with an illustrative post disposed therethrough.

Another illustrative embodiment of channel liner 2 is shown in FIGS. 7 and 8. The top view of a portion of channel liner 2 is shown in FIG. 7. In this illustrative embodiment, a plurality of removable portions 52, 54, 56, and 58 is disposed in floor 4. In the illustrative embodiment, removable portions 52 through 58 are defined by perforated edges. In one illustrative embodiment, all removable portions 52 through 58 share a common perforated edge, identified by reference number 60, as shown in FIG. 7. The plurality of movable portions 52 through 58 are of different sizes to accommodate posts of corresponding different sizes. Accordingly, a removable portion is chosen to be removed based on the size of the post. The perforations defining the selected removable portion are broken to form an opening 62, as illustratively shown in FIG. 8. Opening 62 receives post 64. Illustratively, a seam 66 can be disposed through flooring 4 illustratively from end 10 to the removable portions 52 through 58 as shown in FIG. 7. Seam 66 illustratively bisects a portion of floor 4 into sections to assist in placing channel liner 2 into ground 34 and about post 64, as shown in FIG. 8. It is appreciated, however, that the location of seam 66 on floor 4 can vary depending on the desired application.

Figure 9:
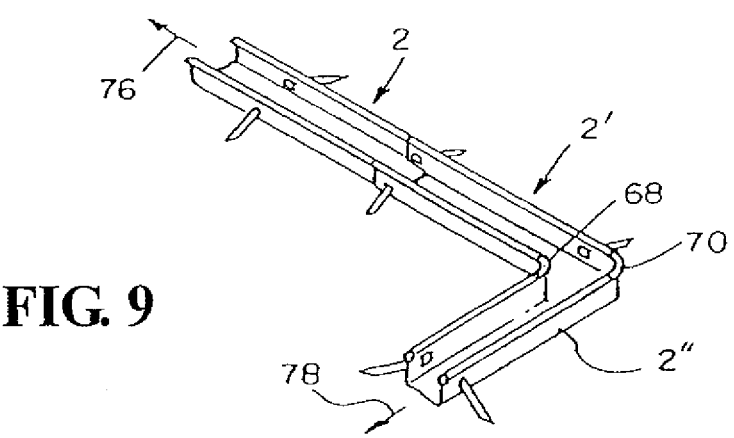
FIG. 9 is a perspective view of an illustrative embodiment of a plurality of landscaping channel liners configured to be combined and extend in a plurality of directions.
Figure 10:
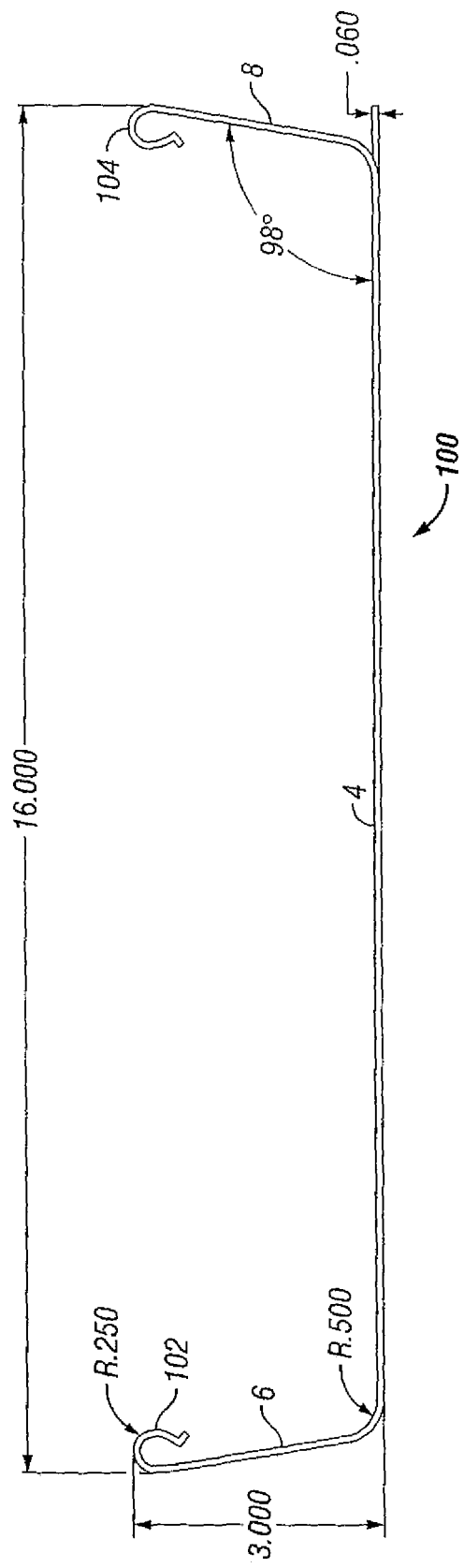
FIG. 10 is a perspective view of an additional illustrative embodiment of a landscaping channel liner.

Another illustrative embodiment of a channel liner is shown in FIG. 9. In this view a plurality of channel liners 2, 2', and 2" can be connected together in such a manner that one channel liner is oriented at a different angle than another channel liner. For example, in the illustrated embodiment, channel liner 2' is connected to channel liner 2" via angled connectors 68 and 70 that are disposed into the receptacles of each respective channel liner, similar to that previously described. It is appreciated that the liners can be modified to create relative angles therebetween of any desired degree.

The result in this illustrative example is that channel liner 2 extends in direction 76, and channel liner 2" extends in direction 78, wherein directions 76 and 78 are not coincident with respect to each other.

Another illustrative embodiment of a landscaping channel liner 100 is shown in FIGS. 10-14. Like channel liner 2, channel liner 100, is longitudinally-extendable to a variety of lengths. In addition, multiple channel liners 100 can be connected end-to-end to produce a channel liner of any length. The illustrative embodiment of channel liner 100 is composed of a floor 4 with longitudinally-extending side walls 6 and 8, similar to channel liner 2. Side walls 6 and 8 extend generally upward from floor 4. In contrast to receptacles 14 and 16 of channel 2, however, channel liner 100 has attachment clips 102 and 104 extending from side walls 6 and 8, respectively. In this embodiment, attachment clips 102 and 104 are configured to clasp onto adjacent clips to hold adjoining channel liners together (see FIG. 13). In one illustrative embodiment, clips 102 and 104 extend the length of side walls 6 and 8, respectively.

Figure 11:
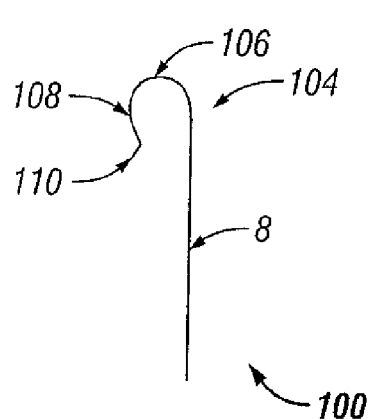
FIG. 11 is a detail cross-sectional view of a sidewall portion of the landscaping channel liner of FIG. 10, showing an end attachment clip formed on the sidewall.

The detail cross-sectional view of sidewall 8 shown in FIG. 11 depicts further detail about attachment clip 104. In the illustrative embodiment, attachment clip 104 comprises a top radius section 106, tangent section 108, and tab 110. Top radius section 106 is illustratively greater than 180° so it can wrap around a second attachment clip. This is aided by the short tangent section 108. Tab 110 extending from tangent section 108 at about 45° completes clip 104. It is appreciated that clip 104 is the same as clip 102 extending from sidewall 6, but in mirror image. Both clips 102 and 104 are useful for connecting to a second landscaping channel liner.

Figure 12:
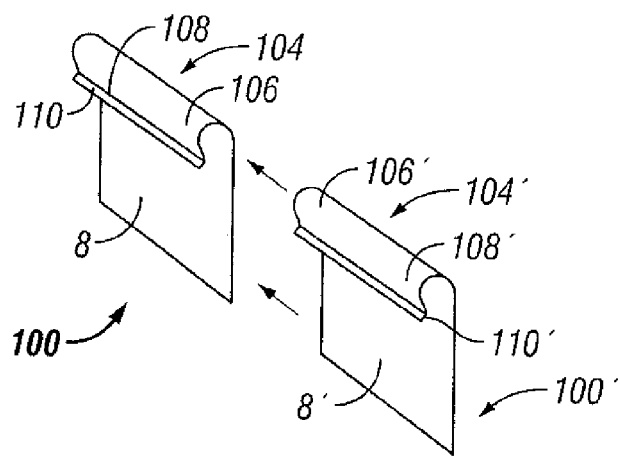
FIG. 12 is a detail perspective exploded view of the sidewall portion of first and second landscaping channel liners of the embodiment of FIGS. 10 and 11.

A detail exploded view of sidewall portions 8 and 8' of first and second channel liners 100 and 100', respectively, is shown in FIG. 12. This view shows how adjacent channel liners 100 and 100' use clips 104 and 104' to attach them together. In the illustrative embodiment, channel liners 100 and 100' can be identical and when overlapping each other, the top radius section 106 of channel liner 100' clasps onto the top radius section 106 of channel 100 connecting them together. Tangent section 108 and tab 110 assist in shrouding one clip over another, securing the two channel liners together similar in configuration to that shown with the previous embodiment.

Figure 13:
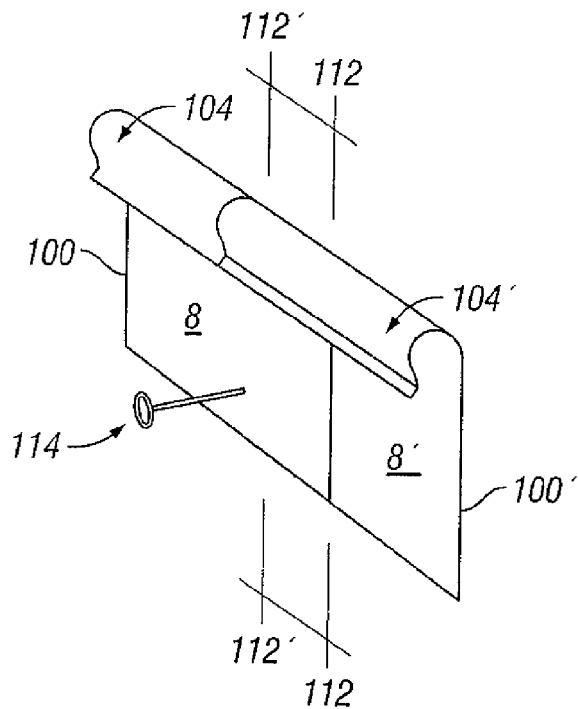
FIG. 13 is a detail perspective view of the sidewall portions of the first and second landscaping channel liners of FIG. 12 shown attached together and configured to receive a stake.

A detailed perspective view of sidewall portions 8 and 8' of channel liners 100 and 100' joined together is shown in FIG. 13. This view shows clip 104' of liner 100' overlapping and clasping onto clip 104 of channel liner 100. As indicated by reference numerals 112 and 112', overlapping the two channel liners allow clips 102 and 104 to hold adjacent channel liners together. A stake 114 can be inserted through both channel liner side walls 8 and 8' to further assist holding the channel liners together. It is appreciated that such a stake can also be inserted through sidewall 6 for the same purpose.

Figure 14:
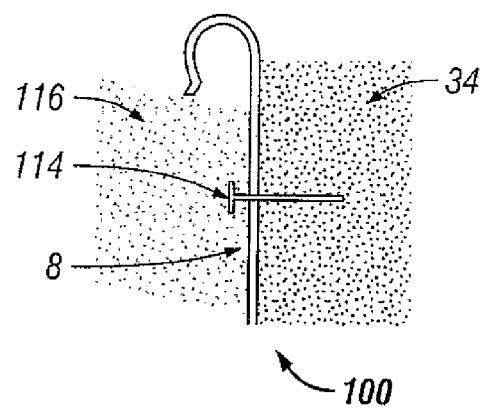

As shown in FIG. 14, stake 114 extends through sidewall 8 and into ground 34. It is appreciated that stake 114 may have an ancillary affect of helping anchor channel liner 100 in ground 34, while at the same time anchoring adjacent channel liners to each other. This view also illustratively shows fill material 116 that can be received in the channel liner and separated from ground 34.

Figure 15A:
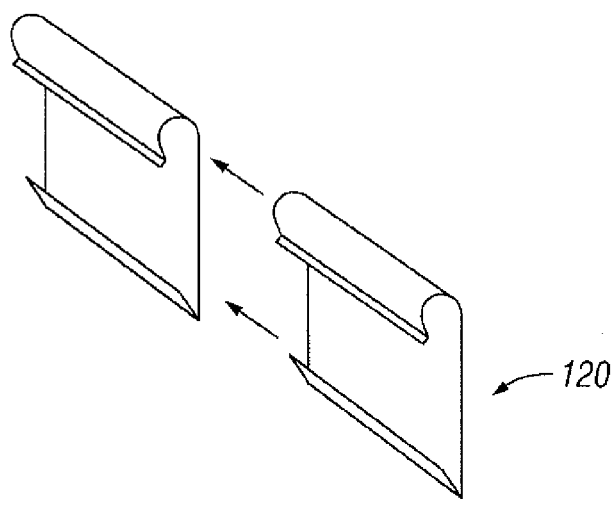
FIGS. 15*a-d* are several views of an embodiment of a landscape edging.
Figure 15B:
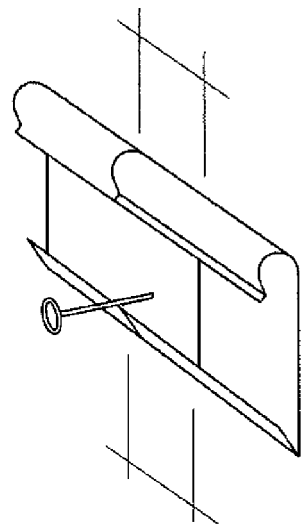
Figure 15C:
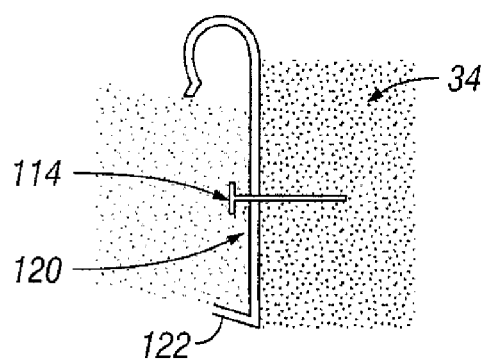
Figure 15D:
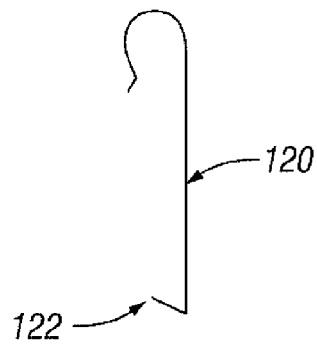

Various views of a landscape edging 120, similar to the sidewall 8 portion of the previous embodiment, are shown in FIGS. 15a-c. In addition, an angled flap 122 helps anchor the edging into ground 34.

Although the present disclosure has been described with reference to particular means, materials, and embodiments, from the foregoing description, one skilled in the art can easily ascertain the essential characteristics of the present disclosure and various changes and modifications may be made to adapt the various uses and characteristics without departing from the spirit and scope of this disclosure.

What is claimed is:

1. A landscaping channel liner comprising:
   at least two landscaping liner members, each landscaping liner member including:
   a longitudinally-extending trough having a longitudinally-extending floor located between opposed longitudinally-extending sidewalls extending therefrom;
   wherein the longitudinally extending floor is configured to be supported, by ground in a channel, along its length;

attachment clips extend longitudinally on each of the sidewalls opposite the floor;

wherein each attachment clip is configured to clasp onto an adjacent attachment clip to hold adjoining channel liners together;

wherein each attachment clip comprises top radius, tangent, and tab sections;

wherein the top radius section is greater than about 180° and located adjacent the tangent section so the attachment clip will overlap and wrap around the adjacent attachment clip;

wherein the tab extends from tangent section at about 45;

wherein each attachment clip is configured such that the radius, tangent and channel liner sidewall form a longitudinally-extending slot opening that faces the longitudinally-extending floor and each attachment clip includes the longitudinally-extending slot opening that faces the longitudinally-extending floor;

wherein the longitudinally-extending slot of each attachment clip is configured so each opening of each attachment clip remains regardless whether the clip is clasping the adjoining channel liner or separated from the adjoining channel liner;

wherein the cross section of the clip is identically shaped along its longitudinal extent, and configured to clasp onto an adjoining clip that is identically shaped; and wherein the sidewalls and floor of the longitudinally-extending trough is configured to overlap a second sidewall and second floor of an adjacent longitudinally-extending trough when the attachment clip overlaps and wraps around the adjacent attachment clip; and wherein the sidewalls and floor of one of the two landscaping liners overlaps the second of the two landscaping liners; and wherein the attachment clip of one of the two landscaping liners overlaps and wraps around the attachment clip of the second of the two landscaping liners connecting the two landscaping liners together.

\* \* \* \* \*